No. 876,847. PATENTED JAN. 14, 1908.
G. T. STAMM.
FRICTION TRANSMISSION GEAR.
APPLICATION FILED MAR. 18, 1907.
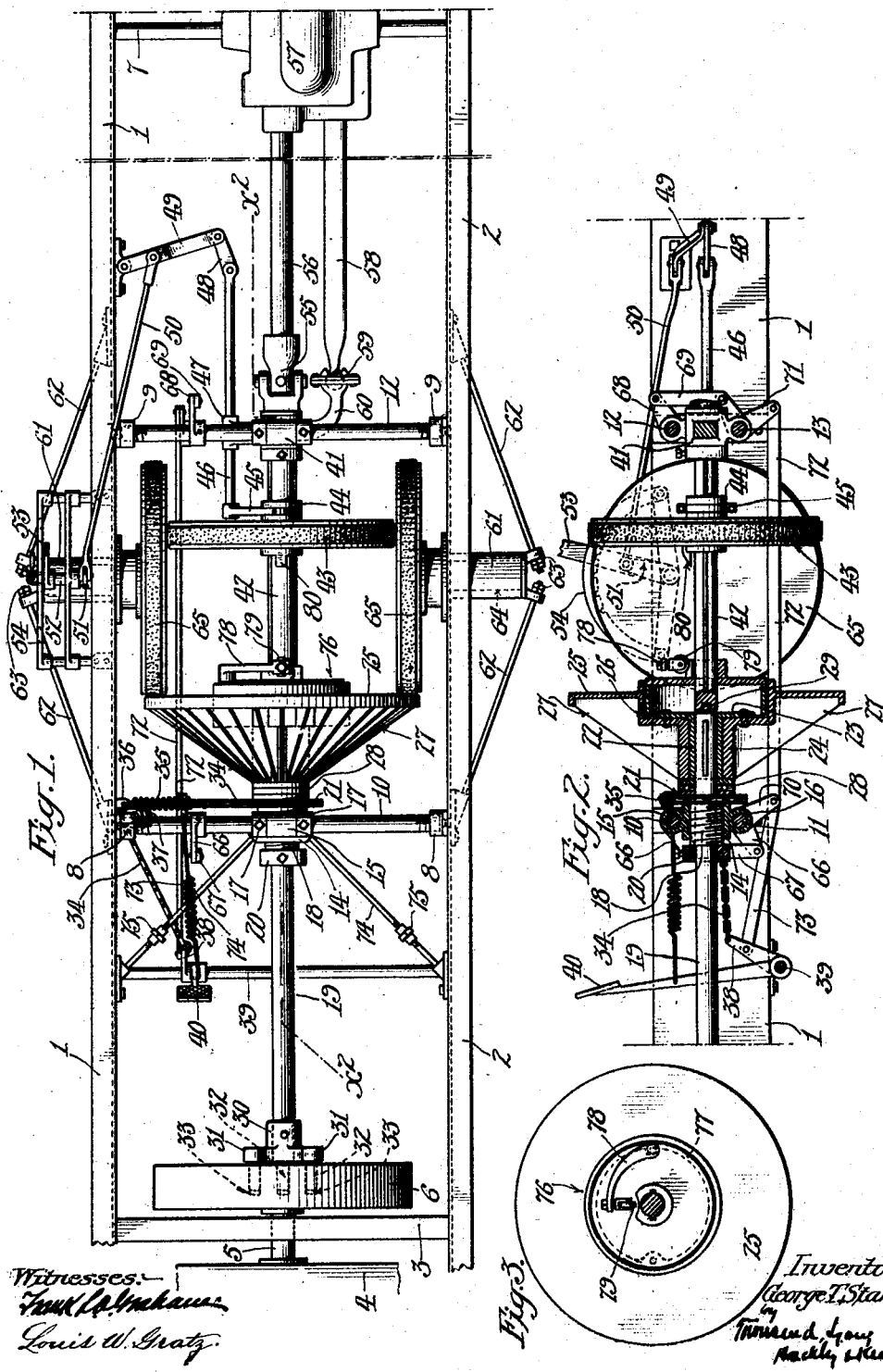
Witnesses:
Inventor:
George T. Stamm.

UNITED STATES PATENT OFFICE.

GEORGE T. STAMM, OF LOS ANGELES, CALIFORNIA.

FRICTION-TRANSMISSION GEAR.

No. 876,847.　　　　　Specification of Letters Patent.　　　　Patented Jan. 14, 1908.

Application filed March 18, 1907. Serial No. 363,119.

*To all whom it may concern:*

Be it known that I, GEORGE T. STAMM, a citizen of the United States, residing at Los Angeles, in the county of Los Angeles and State of California, have invented a new and useful Friction-Transmission Gear, of which the following is a specification.

This invention relates to friction transmission gears, and the objects of the invention are to provide for driving the driven shaft at a variable speed in either direction with respect to the driving shaft, or to clutch the driven shaft with the driving shaft to cause the driven shaft to be driven directly by the driving shaft at a uniform speed therewith and without any frictional engagement between the respective friction gears or wheels.

Other objects are to provide a simple construction which is strong and durable, effective in operation and economical of construction.

The accompanying drawings illustrate the preferred form of the invention, and referring thereto:—Figure 1 is a plan view of the greater portion of the frame of an automobile equipped with the transmission gearing. Fig. 2 is a vertical longitudinal section on line $x^2$—$x^2$ Fig. 1, the end portions of the frame of the automobile having been removed. Fig. 3 is a face view of the clutch for connecting the driven shaft directly to the driving shaft.

A distinguishing feature of this invention is that the elements of the gearing are mounted upon the regular automobile frame and not upon any sub-frame or auxiliary frame, and the side bars of the automobile frame are capable of being bent slightly to effect the engagement or disengagement between certain friction wheels. This slight bending action of the side frame members of the automobile frame is extremely slight being only that small amount of movement which is necessary to cause one friction element to be moved into contact or out of contact with its co-acting friction element.

The side members of the automobile frame near their ends are rigidly spaced apart by the usual cross bars, and as the bending movement is so very slight and is distributed through such a long distance the strain is readily sustained by the side frame members, there being in fact no greater amount of bending movement than the ordinary automobile frame sustains in normal operation when in use on the road.

1 and 2 designate the side members of the frame of the automobile which, as shown in Fig. 2, are made quite wide, measured vertically. Near their front ends the members 1 and 2 are rigidly spaced and connected together by a cross-bar 3 which lies at the rear of the engine, the latter being located at 4 and having a motor shaft 5 equipped with a fly-wheel 6. The side frame members 1 and 2 near their rear ends are connected by the usual cross-bars.

7 designates the rear axle which may be of any preferred type of construction. There may be other cross braces adjacent the ends of the side frame members 1 and 2, but there are no cross braces or other elements along their intermediate portions which prevent flexing of the side members except certain elements employed for the specific purpose of bending the side frame members.

A pair of stationary nuts 8 are attached to the frame member 2, one nut 8 being located near the top of the frame 2 and the other nut being located underneath as shown in Fig. 2. Another pair of similar nuts 9 are attached to the frame 2 in a similar manner, one being underneath the other as shown in Fig. 2, and the side frame member 1 is equipped with two pairs of nuts 8 and 9 arranged opposite the respective nuts 8 and 9 on side frame member 2. Four frame operating shafts 10, 11, 12 and 13 extend across between the side frame members 1 and 2, each shaft being provided with right hand threads at one end and with left hand threads at the other end, the screw threaded ends of shaft 10 engaging the upper nuts 8 of side frames 1 and 2, the screw threaded ends of shaft 11 engaging the lower nuts 8 of side members 1 and 2, the threaded ends of shaft 12 engaging upper nuts 9 of side frame members 1 and 2 and the threaded ends of shaft 13 engaging lower nuts 9 of frame members 1 and 2. Thus by imparting simultaneous rotation to these four shafts the side members 1 and 2 of the frame may be sprung toward or away from each other, and into whatever position the side frame members 1 and 2 may be bent they are rigidly maintained in such position by the four shafts 10, 11, 12 and 13.

The shafts 10 and 11 support a non-revoluble nut 14, the latter having upper lugs 15 and lower lugs 16 through which the shafts 10 and 11 respectively loosely pass, each shaft 10 and 11 having collars 17 for holding the nut 14 in a central position. Engaging in the nut 14 is a hollow screw or threaded sleeve 18, the internal bore of which is smooth. A driving shaft 19 passes through the threaded sleeve 18 being rotatably mounted therein, and a collar 20 is fixed on the shaft 19 and abuts against the forward end of the screw 18. The screw 18 carries a sprocket 21 which sprocket lies behind the nut 14. A sleeve 22 is keyed to the shaft 21 and has a flange 23, and mounted on the sleeve 22 is the hub 24 of a driving friction disk 25, the latter having a concentric recess 26 which receives the flange 23, the flange being bolted or riveted to the adjacent recessed portion of the friction disk 25. The friction disk 25 is preferably formed of aluminum and has radial strengthening webs 27 which extend from the disk 25 to the hub 24. Arranged between the hub 24 and the sprocket 21 is a ball thrust bearing 28. The rear end of shaft 19 is substantially flush with the flange 23 but has a central stud 29 projecting rearwardly from its end. The front end of shaft 19 is provided with a collar 30 having three lugs 31, from each of which lugs projects a stud 32, the hub of the fly-wheel 6 having sockets 33 which receive the respective studs 32 and permit of a sliding movement of the studs therein when the shaft 19 is moved longitudinally.

Passing over the sprocket 21 is a chain 34, the upper lead of which is connected by a spring 35 with a lug 36 on the side frame member 1. The lower lead of the chain 34 extends toward the side frame 1 and is twisted a quarter way around and passes over a sheave 37 and thence to an arm 38 which projects from a shaft 39, the latter being operable by a foot lever 40.

A journal bearing 41 is supported by the rear shafts 12 and 13, as shown in Fig. 2, and mounted in the journal bearing 41 is the rear end of a driven shaft 42, the forward end of which has a socket which receives the stud 29 of the driving shaft 19. This holds the two shafts in true axial alinement. Splined on the shaft 42 is a friction-wheel 43 having a grooved hub 44 which is operated by a split arm 45 carried by a shift rod 46 which is slidably mounted in a bracket 47 which projects from the journal bearing 41. The rear end of the shift rod 46 is connected by a link 48 with a swinging arm 49, as shown in Figs. 1 and 2, and the swinging arm 49 is connected by a link 50 with an arm 51 which projects from a shaft 52, a hand lever 53 being provided for operating the shaft 52, the hand lever operating over a suitable sector 54 and being equipped with latch mechanism which it is not necessary to show and describe. Thus by swinging the hand lever 53 in either direction the friction wheel 43 may be moved along the shaft 42 through the medium of the connecting linkage described.

The rear end of the driven shaft 42 is connected by a universal joint 55 with a rear shaft 56 which extends to the gear casing 57 on the rear axle 7. A radius rod 58 is rigidly connected to the gear casing 57 and is provided with a ball and socket joint 59 forming means of connection with a bracket 60 extending from the journal 41. The ball and socket joint 59 being located concentrically with the universal joint 55 insures that the swing of the radius rod will always coincide with the swing of the shaft 56.

Journal bearings 61 are mounted on the side frame members 1 and 2 and are braced by tie rods 62, the tie rods being provided with regulating nuts 63 whereby the journal bearings 61 may be properly trued up. Mounted in the respective journal bearings 61 are shafts 64, each shaft 64 carrying an intermediate friction wheel 65, each friction wheel having two friction surfaces, one of which is at the periphery of the wheel and is adapted to contact with the face of the friction disk 25, while the flat friction face of each friction wheel 65 is adapted to contact with the friction wheel 43. The frictional contact is established between the flat faces of friction wheels 65 and friction wheel 43 by springing the side frame members 1 and 2 toward each other. This is accomplished by turning the four shafts 10, 11, 12 and 13 simultaneously. Shafts 10 and 11 have arms 66 which are connected by a link 67, and shafts 12 and 13 have arms 68 which are connected by a link 69. Shafts 11 and 13 are respectively provided also with arms 70 and 71 which are connected by a long link 72, and a shorter link 73 extends from the arm 70 to the arm 38, before described, which is mounted on shaft 39. Braces 74 extend from nut 17 to the respective side frame members 1 and 2 and are equipped with turn buckles 75 for regulating their length. These braces 74 form strut rods to prevent the central portions of shafts 10 and 11 from being bent forward when the friction disk 25 is forced against the friction wheels 65.

A clutch 76, shown in detail in Fig. 3, is arranged on the driven shaft 42 to clutch with the recessed portion 26 of the friction disk 25. This clutch is constructed in the well known manner having a split expanding ring 77 which is expanded by a lever 78, the latter carrying an antifriction roller 79. The lever 78 is operated by a wedge 80 carried by the hub of the friction wheel 43. Thus when the friction wheel 43 is moved into the extreme forward position the wedge 80 is forced under the roller 79 and swings out the lever 78, thus expanding the ring 77 and clutching the shaft 42 tightly with the friction disk 25, and as the latter is rigidly mounted on shaft 19 the two shafts 19 and 42 are thus caused to rotate in unison.

In Fig. 1 the wheel 43 is shown in a position which imparts a rearward movement of the automobile, assuming that the crank shaft of the engine turns clockwise at the front in the usual manner, and it is obvious that as the shaft 19 is rotated with all the parts in the position shown in Fig. 1, that the friction disk 25 will impart rotation to friction wheels 65, causing the latter to rotate in opposite directions, and that the friction wheels 65 in turn impart rotation to the friction wheel 43, driving the latter in a direction opposite to that of the friction disk 25, and that the friction wheel 43 drives the shaft 42 and rear shaft 46 in the same direction, the shaft 56 operating through the usual gearing to impart rotation to the gear axle 7 to propel the automobile backward. To reduce the speed of the automobile the foot lever 40 is allowed to be retracted by the contraction of spring 35 acting through chain 44, and as the foot lever 40 is thus moved back by the spring, the links 73 and 72 acting on arms 70 and 71 cause shafts 11 and 13 to be turned counter-clockwise, the shafts 10 and 12 being simultaneously turned counter-clockwise through the medium of links 67 and 69. Thus as all four shafts 10, 11, 12 and 13 are rotated counter-clockwise their threaded ends acting in the four nuts 8 and 9 force apart the side frame members 1 and 2, and as the frame members are thus sprung out they carry the two friction wheels 65 out of contact with the friction wheel 43. At the same time the spring 35 in contacting and drawing back the chain 44 causes the sprocket 21 to rotate which turns the threaded sleeve 18 in the non-revoluble nut 14 and causes the threaded sleeve to ride forward and carry with it the shaft 19, and as the shaft 19 moves forward it withdraws the friction disk 25 from contact with both friction wheels 65. In this manner all friction is removed between the rotating friction elements and permits the friction wheel 43 to be easily slid along the shaft 42 by operating hand lever 53. When the friction wheel 43 has been moved into the desired position, the foot lever 40 is pushed forward which draws upon the chain 44, stretching the spring 35, and rotates sprocket 21 which turns the threaded sleeve 18 in the reverse direction and forces rearwardly the shaft 19 and friction disk 25, moving the latter into frictional contact with both friction wheels 65. At the same time as the foot lever 40 is swung forward the four shafts 10, 11, 12 and 13 are rocked through the medium of the before described linkage, and the side frame members 1 and 2 are drawn toward each other thus forcing the two friction wheels 65 against the friction wheel 43.

The lowest speeds are secured by adjusting the friction wheel 43 closer to the center of the friction wheels 65, but when it is desired to drive the automobile by direct connection between shaft 42 and 19 instead of through the intermediate friction gearing, the foot lever 40 is allowed to be retracted by spring 35, whereupon the four rotating friction elements are moved out of contact with each other, and then by moving forward the hand lever 53 the friction wheel 43 is moved forward to shove the wedge 80 under the roller 79, thus operating the lever 78 and clutching the two shafts 42 and 19 together, whereupon the drive from the motor shaft will be direct from shaft 19 to shaft 42.

It will be noted that by adjusting the nut 63 on braces 62 it is possible to adjust the friction wheels 65 very accurately. When the two side frame members 1 and 2 are sprung toward each other the strut rods 74 acting against the nut 14 force the latter back slightly and this augments the pressure between the disk 25 and two friction wheels 65.

What I claim is:—

1. In a motor vehicle, in combination with the side frame members of the vehicle, intermediate friction wheels carried by the side frame members, a driving shaft, a driving friction disk carried by the driving shaft, a driven shaft, a driven friction wheel on the driven shaft, and means for moving the driving friction disk against the intermediate friction wheels and simultaneously bending the side frame members of the vehicle, to move the intermediate friction wheels against the driven friction wheel.

2. In a motor vehicle, in combination with the side frame members of the vehicle, intermediate friction wheels carried by the side frame members, a driving shaft, a driving friction disk carried by the driving shaft, a driven shaft, a driven friction wheel on the driven shaft, means for moving the driving friction disk against the intermediate friction wheels and simultaneously bending the side frame members of the vehicle to move the intermediate friction wheels against the driven friction wheel, and means for adjusting the driven friction wheel radially of the intermediate friction wheels.

3. In a motor vehicle, in combination with the side frame members of the vehicle, intermediate friction wheels mounted on the side frame members, said friction wheels adapted to be moved longitudinally of their axis when the side frame members are bent, said side frame members preventing the friction wheel from being moved longitudinally of the vehicle, a driving friction disk, a driven friction disk, and means for bending said side frame members and moving said intermediate friction wheels into contact with the driven friction disk and moving said driving friction disk rearwardly into contact with the intermediate friction wheels.

4. In a motor vehicle, in combination with the side frame members of the vehicle, intermediate friction wheels carried by the side frame members, a driving shaft, a driving friction disk carried by the driving shaft, a driven shaft, a driven friction wheel on the driven shaft, means for moving the driving friction disk against the intermediate friction wheels and simultaneously bending the side frame members of the vehicle to move the intermediate friction wheels against the driven friction wheel, and means for adjusting the driven friction wheel radially of the intermediate friction wheels and for clutching said driven shaft with the driving shaft.

5. In a motor vehicle, a driving shaft, a driven shaft, a driving friction disk on the driving shaft, a threaded sleeve for shifting the driving shaft longitudinally, the driving shaft being rotatable in the sleeve, a nonrevoluble nut engaging said threaded sleeve, a driven friction wheel on the driven shaft, side frame members of the motor vehicle, intermediate friction wheels mounted on the side frame members, and means for turning the threaded sleeve and bending the side frame elements to shift the driving shaft and force the driving friction disk against the intermediate friction wheels and moving the intermediate friction wheels into contact with the driven friction wheel.

6. In a motor vehicle, a driving shaft, a driven shaft, a driving friction disk on the driving shaft, a threaded sleeve for shifting the driving shaft longitudinally, the driving shaft being rotatable in the sleeve, a nonrevoluble nut engaging said threaded sleeve, a driven friction wheel on the driven shaft, side frame members of the motor vehicle, intermediate friction wheels mounted on the side frame members, means for turning the threaded sleeve and bending the side frame elements to shift the driving shaft and force the driving friction disk against the intermediate friction wheels and moving the intermediate friction wheels into contact with driven friction wheel, and means for adjusting the driven friction wheel along the driven shaft and for clutching the driven shaft with the driving shaft.

7. In a motor vehicle, a driving shaft, a driven shaft, a driving disk on the driving shaft, a driven friction wheel on the driven shaft, side frame members of the motor vehicle, intermediate friction wheels mounted on the side frame members, a threaded sleeve for shifting the driving shaft longitudinally, the driving shaft being rotatable in the sleeve, a stationary nut engaging the threaded sleeve, a flexible connection attached to the nut for rotating the nut, a spring for drawing the flexible connection in one direction, cross shafts with threaded ends engaging nuts on the side frame members, and means for turning the latter shafts simultaneously to bend the side frame members and for drawing said flexible connection to turn the threaded sleeve.

8. In a motor vehicle, in combination with the side frame members of the vehicle, a plurality of cross shafts having threaded ends engaging nuts on the side frame members, journal bearings arranged transversely on the side frame members, intermediate friction wheels with the shafts mounted in said journal bearings, a driving friction disk, means for moving the driving friction disk into contact with the peripheries of the intermediate friction wheels, a driven shaft, a driven friction wheel on the driven shaft, and means for simultaneously turning the cross shafts to bend the side frame members and move the intermediate friction wheels into or out of engagement with the driven friction wheel.

9. In a motor vehicle, in combination with the side frame members of the vehicle, a plurality of cross shafts having threaded ends engaging nuts on the side frame members, journal bearings arranged transversely on the side frame members, intermediate friction wheels with the shafts mounted in said journal bearings, a driving friction disk, means for moving the driving friction disk into contact with the peripheries of the intermediate friction wheels, a driven shaft, a driven friction wheel on the driven shaft, means for simultaneously turning the cross shafts to bend the side frame members and move the intermediate friction wheels into or out of engagement with the driven friction wheel, and adjustable braces extending from the outer ends of said journal bearings to the side frame members for adjusting said bearings to regulate the plane of rotation of the intermediate friction wheels.

10. In a motor vehicle, a driving friction disk, a driven friction disk, intermediate friction wheels, means for securing contact between the intermediate friction wheels and the driven friction disk, and positive means for positively moving the driving friction disk into contact with the intermediate friction wheels.

11. In a motor vehicle, a driving friction disk, a driven friction disk, intermediate friction wheels, means for securing contact between the intermediate friction wheels and the driven friction disk and for positively preventing bodily movement of the intermediate friction wheels in the plane of their rotation, and means for moving the driving friction disk into contact with the intermediate friction wheels.

In testimony whereof, I have hereunto set my hand at Los Angeles California this 9th day of March 1907.

GEORGE T STAMM.

In presence of—
   GEORGE T. HACKLEY,
   FRANK L. A. GRAHAM.